Figure 1:
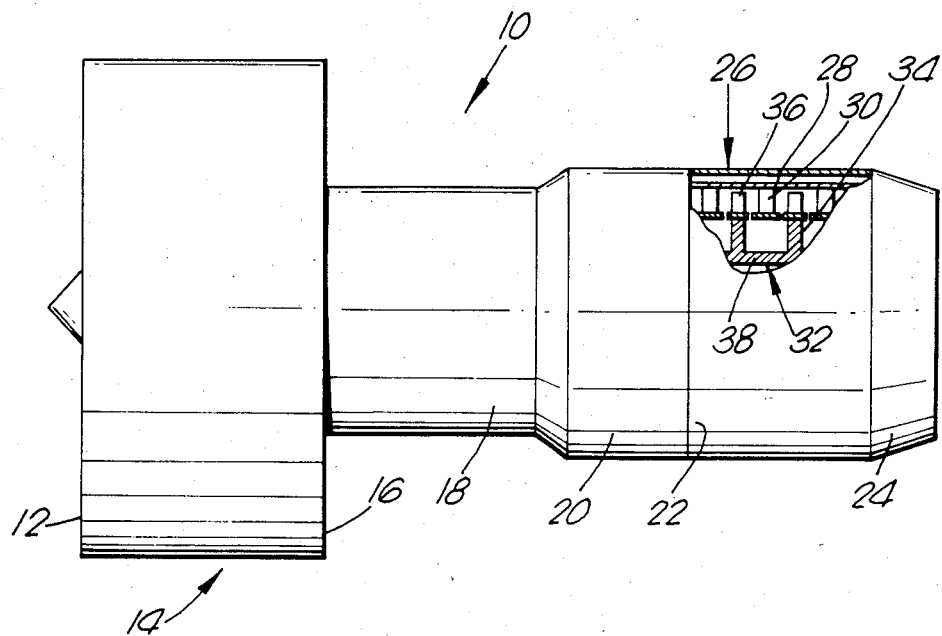

United States Patent [19]

Moss et al.

[11] Patent Number: 4,604,031
[45] Date of Patent: Aug. 5, 1986

[54] HOLLOW FLUID COOLED TURBINE BLADES

[75] Inventors: Roger W. Moss; Michael H. Coney; David A. Richardson, all of Derby, England

[73] Assignee: Rolls-Royce Limited, London, England

[21] Appl. No.: 769,702

[22] Filed: Aug. 27, 1985

[30] Foreign Application Priority Data

Oct. 4, 1984 [GB] United Kingdom ............... 8425092

[51] Int. Cl.$^4$ ............................................. F01D 5/18
[52] U.S. Cl. .............................. 416/97 R; 415/115; 416/92; 416/96 R
[58] Field of Search ............ 416/92, 96 A, 96 R, 416/97 R; 415/115

[56] References Cited

U.S. PATENT DOCUMENTS

| | | | |
|---|---|---|---|
| 3,885,609 | 5/1975 | Frei et al. | 415/115 X |
| 4,162,136 | 7/1979 | Parkes | 415/115 X |
| 4,236,870 | 12/1980 | Hucul et al. | 416/97 R |
| 4,278,400 | 7/1981 | Yamarik et al. | 415/115 X |
| 4,292,008 | 9/1981 | Grosjean et al. | 415/115 |
| 4,416,585 | 11/1983 | Abdel-Messeh | 415/115 X |
| 4,456,428 | 6/1984 | Cuvillier | 415/115 X |
| 4,474,532 | 10/1984 | Pazder | 415/115 X |
| 4,515,526 | 5/1985 | Levengood | 416/97 R X |

FOREIGN PATENT DOCUMENTS

| | | | |
|---|---|---|---|
| 1087527 | 10/1980 | Canada | 416/92 |
| 2112467A | 7/1983 | United Kingdom . | |
| 2112468A | 7/1983 | United Kingdom . | |

Primary Examiner—Everette A. Powell, Jr.
Attorney, Agent, or Firm—Cushman, Darby & Cushman

[57] ABSTRACT

Hollow fluid cooled turbine blades of the multi-pass type used in gas turbine engines have suffered from separation of cooling fluid from longitudinally extending walls defining longitudinally extending passages as the cooling fluid is turned through a turning passage from one longitudinally extending passage to an adjacent one. The invention provides an aerodynamically shaped end portion arranged at an angle with respect to the remainder of the wall to increase the turning radius, and a turning vane is positioned in turning passage to form a convergent passage with the end portion of wall. The turning vane has a large turning radius and a large surface area for retention of a boundary layer of cooling fluid thereon. The turning vane directs the cooling fluid flowing through the convergent passage and over the turning vane substantially parallel to the wall to reduce separation in order to reduce pressure losses. The turning vane may be provided with a tail and bleed holes may be provided in the suction sidewall to reduce separation.

5 Claims, 6 Drawing Figures

HOLLOW FLUID COOLED TURBINE BLADES

The present invention relates to hollow fluid cooled turbine blades particularly for use in gas turbine engines.

Hollow cooled turbine blades generally comprise longitudually extending passages which convey cooling fluid, generally air, although other fluids have been used ie, molten metals, through the turbine blade in order to pick up and dissipate heat from the walls of the turbine blade.

In many designs of hollow cooled turbine blades the cooling fluid passes up and down adjacent longitudinally extending passages and the cooling flow must be turned through angles of the order of 180° in turning passages connecting the longitudinally extending passages. The present invention is concerned with this later type of turbine blade.

These types of turbine blades, generally called "multi pass blade", suffer from a problem in the turning passage and longitudinally extending passages. As the cooling fluid flows through a first longitudinally extending passage and enters the turning passage the cooling fluid must turn through an angle of 180° into the adjacent longitudinally extending passage, and the boundary layer of cooling fluid formed on a wall separating the two adjacent longitudinally extending passages becomes detached from the wall in the turning passages and the second longitudinally extending passage causing generation of vortices and turbulence which gives rise to a pressure loss.

Attempts to overcome this problem have used the addition of one or more turning vanes positioned in the turning passage, but these have proved to be of only marginal benefit, as the boundary layer still separates from the wall and vanes and, vortices and turbulence are produced in the turning passage and second longitudinally extending passage.

The present invention seeks to reduce the turbulence generated in the turning passage and second longitudinally extending passage by reducing the separation of the boundary layer in order to reduce pressure losses in the cooling fluid flow through the turbine blade.

Accordingly the present invention provides a hollow fluid cooled turbine blade comprising a root, a platform and an aerofoil, the aerofoil having at least two longitudinally extending passages for the flow of cooling fluid, at least one turning passage where the cooling fluid is turned from the first longitudinally extending passage into the second longitudinally extending passage, a wall being positioned between and separating the longitudinally extending passages, said wall having an aerodynamically shaped end portion adjacent said turning passage, said aerodynamically shaped end portion of said wall being arranged at an angle with respect to the remainder of said wall to increase the turning radius and said aerodynamically shaped end portion of said wall extending towards a second wall defining an opposing boundary of said first passage, a turning vane having a relatively large turning radius being spaced from said aerodynamically shaped end portion of said wall to define a passage therebetween, said passage between said aerodynamically shaped end portion of said wall and said turning vane converging in the direction of flow from said first longitudinally extending passage to said second longitudinally extending passage, said turning vane extending around said aerodynamically shaped portion of said wall towards said second longitudinally extending passage so as to direct cooling fluid flowing from said first passage into said second passage through said converging passage formed between said aerodynamically shaped end portion of said wall and said turning vane substnatially parallel to said wall, said turning vane directing the cooling fluid flowing around said turning vane substantially parallel to the cooling fluid leaving said converging passage so as to reduce separation of the boundary layer of the cooling fluid from said wall in order to reduce pressure losses in said turning passage.

The turning vane may have a tail extending longitudinally of the blade parallel to said wall in said second passage to direct cooling fluid leaving said converging passage formed between said aerodynamically shaped end portion of said wall and said turning vane substantially parallel to said wall.

The aerofoil is defined by a pressure and a suction sidewall, the suction sidewall may be provided with bleed holes, one bleed hole being provided in the converging passage adjacent the leading edge of the aerodynamically shaped end portion of the wall, one bleed hole being provided in the turning passage adjacent the leading edge of the turning vane.

The wall and the turning vane may form an angle of substantially 90° with the pressure and suction sidewalls of the aerofoil to reduce separation of the cooling fluid from said wall and turning vane at said suction wall.

The present invention will be more fully described by way of reference to the accompanying drawings, in which:

FIG. 1. is a partially cut-away view of a gas turbine engine showing a hollow fluid cooled turbine blade according to the present invention.

Figure 2:
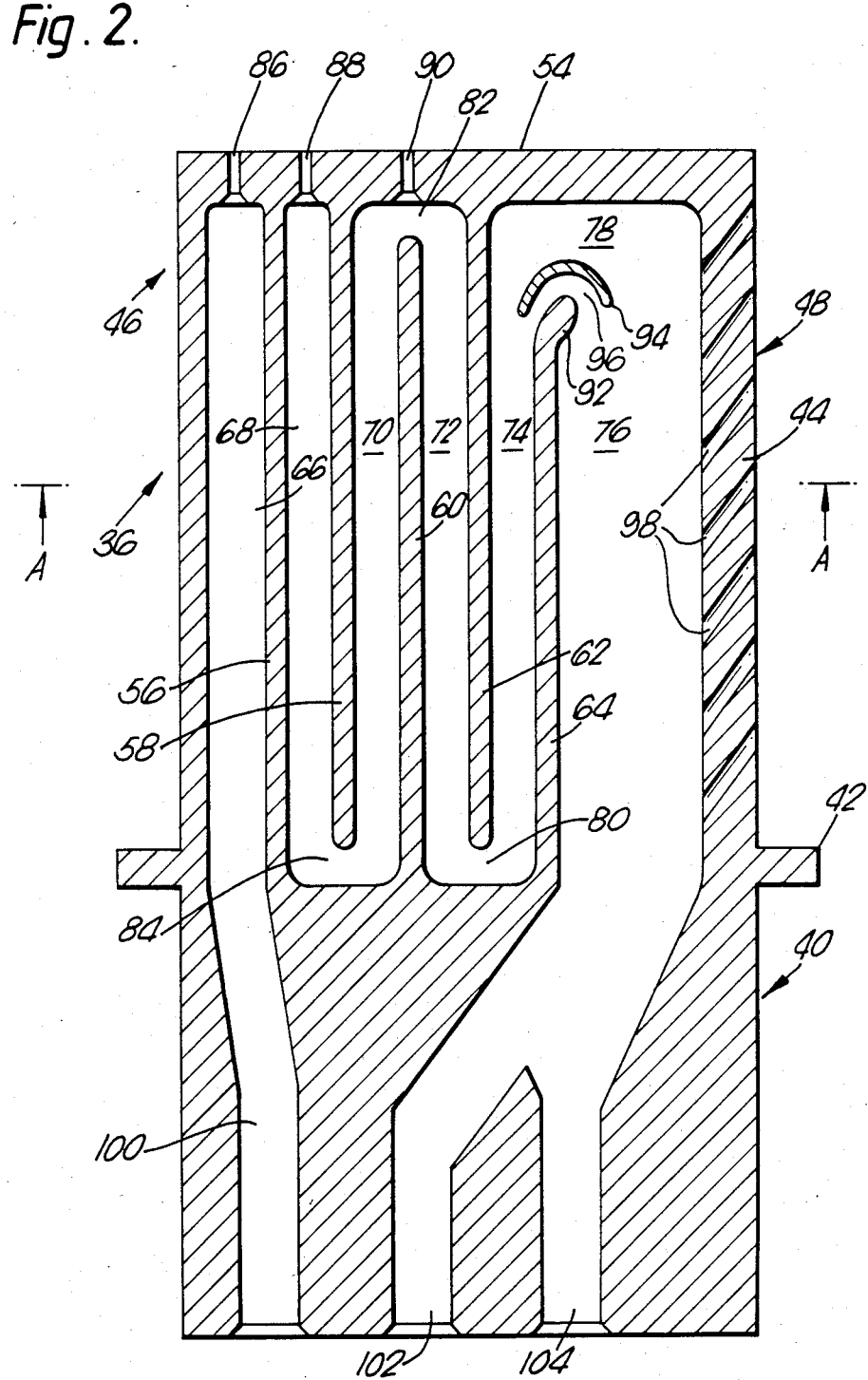

FIG. 2. is an enlarged view of the hollow fluid cooled turbine blade in FIG. 1.

Figure 3:
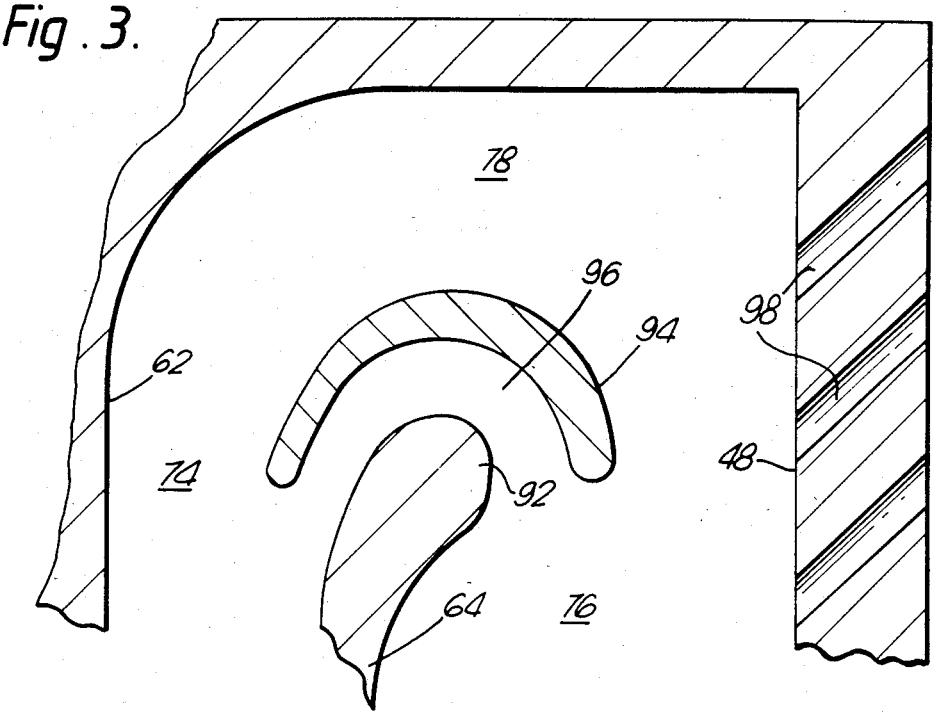

FIG. 3. is an enlarged view of a turning passage of a hollow fluid cooled turbine blade in FIG. 2.

Figure 4:
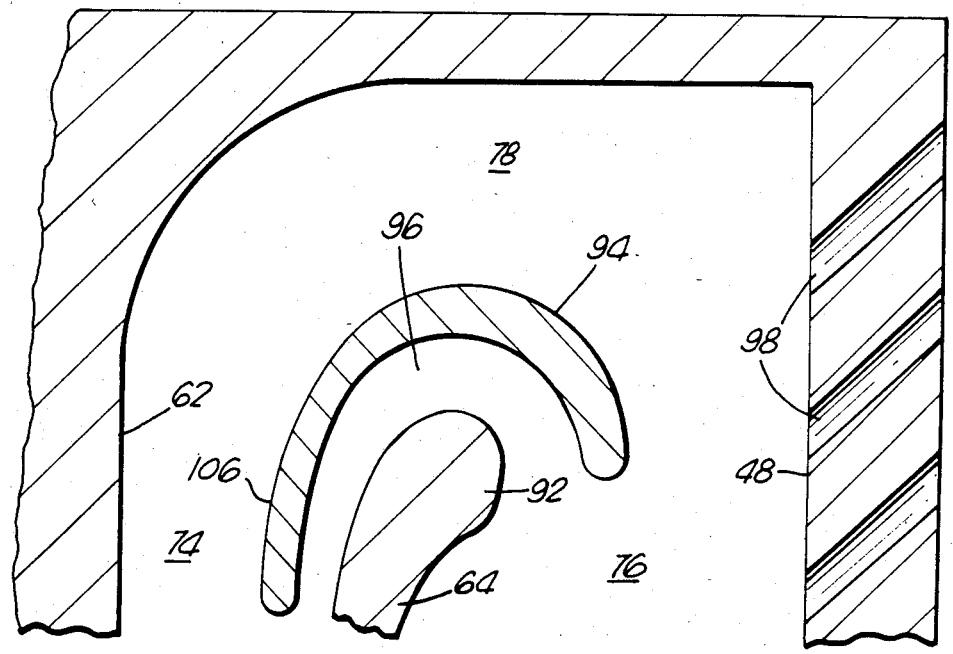

FIG. 4. is an enlarged view of an alternative embodiment of a turning passage of a holllow fluid cooled turbine blade in FIG. 2.

Figure 6:
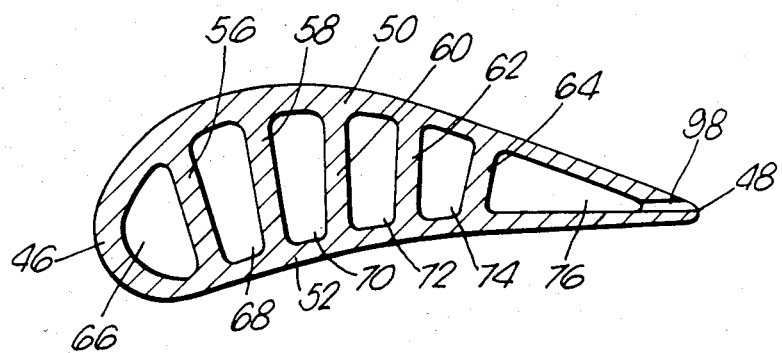
Figure 5:
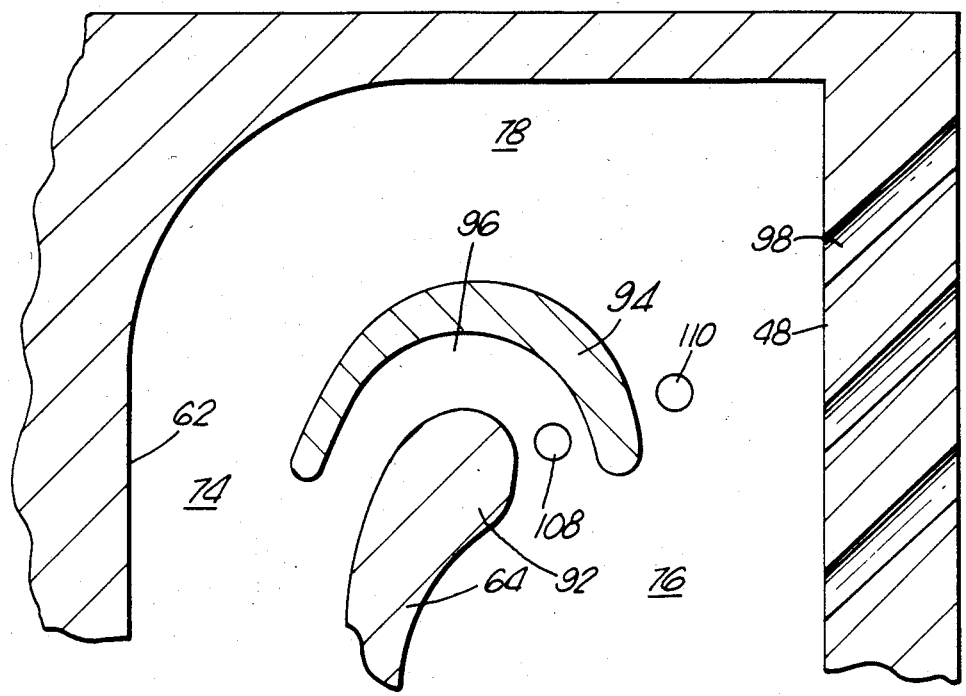

FIG. 5. is an enlarged view of a further embodiment of a turning passage of a fluid cooled turbine blade in FIG. 2. and FIG. 6. is a section along line A—A in FIG. 2.

FIG. 1. shows a gas turbine engine 10, which in this case is a turbofan engine, and comprises in flow series an intake 12, a fan and intermediate pressure compressor denoted jointly by numeral 14, a high pressure compressor 18, a combustion system 20, a turbine section 22 and an exhaust nozzle 24. The gas turbine engine works in a well known manner, in that air is compressed by the fan, intermediate and high pressure compressors 14 and 18 respectively, before being supplied into the combustion system 20. Fuel is injected into the combustion system and is burnt in the compressed air to produce hot gases which drive the turbines in the turbine section 22 before leaving the gas turbine engine 10 through exhaust nozzle 24. The turbines drive the fan, intermediate and high pressure compressors via shafts, not shown in the figure. The fan also provides additional thrust by driving air through a fan duct 16 around the core engine.

The turbine section 22 comprises a stator assembly 26 having a casing 28 which forms a boundary for the flow of hot gases, and which carries stator vanes 30 and forms shrouds for one or more sets of rotor blades. A rotor assembly 32 comprises one or more turbine discs 34 carrying circumferential arrays of radially extending turbine blades 36. The turbine discs 34 are connected to the compressor via shafts 38.

The turbine blades 36 are shown more clearly in FIG. 2., and are hollow cooled turbine blades of the multi pass type. The turbine blade 36 comprises a root 40, a platform 42 and an aerofoil portion 44. The aerofoil 44 comprises a leading edge 46 and a trailing edge 48, and a suction sidewall 50 and a pressure sidewall 52 extend from the leading edge to the trailing edge to define the aerofoil. The aerofoil also has a tip wall 54 at its longitudinal extremity remote from the platform 42. There are a plurality of internal walls 56, 58, 60, 62 and 64 respectively which extend longitudinally of the aerofoil from the platform 42 or the tip wall 54, to divide the aerofoil into a number of longitudinally extending passages 66, 68, 70, 72, 74 and 76 respectively. At the longitudinal extremities of the aerofoil 44 are turning passages 78, 80, 82 and 84 which interconnect passages 76, 74, 72 and 70 to form a flow passage for cooling fluid. The tip wall 54 has a number of apertures 86, 88 and 90 which extend from passages 66, 68 and 82 respectively for permitting cooling fluid to be blown over the tip of the aerofoil 44 for cooling purposes and to reduce leakage of motive fluid between the blade tip and a respective shroud structure.

The longitudinally extending internal wall 64 near the trailing edge of the aerofoil 44 has an aerodynamically shaped end portion 92 adjacent turning passage 78. The aerodynamically shaped end portion 92 of the wall 64 is arranged at an angle with respect to the remainder of the wall 64, and the aerodynamically shaped end portion 92 extends towards the trailing edge 48 of the pressure and suction sidewalls 52 and 50 respectively.

A turning vane 94 of relatively large turning radius is positioned within the turning passage 78 and is spaced from the aerodynamically shaped end portion 92 of the wall 64 to define a convergent passage 96 therebetween. The turning vane 94 extends around the aerodynamically shaped end portion 92 of the wall 64 so that the leading edge of the turning vane 94 is adjacent the leading edge of the aerodynamically shaped end portion 92 of the wall 64, and the trailing edge of the turning vane 94 extends into passage 74 and is adjacent the trailing edge of the aerodynamically shaped end portion 92 where the end portion 92 joins the remainder of the wall 64.

The convergent passage 96 converges in the direction from the leading edge to the trailing edge of the turning vane 94. The trailing edge 48 of the aerofoil 44 is provided with a plurality of discharge slots 98 or apertures for the discharge of cooling fluid from passage 76 over the trailing edge of the aerofoil 44 for film cooling thereof. The root 40 and platform 42 have passages 100, 102 and 104 which supply cooling fluid, generally air, supplied from the compressor 14 or 18 to the internal longitudinally entending passages 66 and 76 in the aerofoil 44 of the turbine blade 36.

FIG. 3. shows the turning passage 78 and the associated turning vane 94, and the aerodynamically shaped end portion 92 of the longitudinally extending wall 64 to a larger scale. The convergent passage 96 can be seen clearly and is formed between the smooth shaped aerodynamic end portion 92 and the turning vane 94.

In operation the cooling air supplied from the compressor 14 or 18 through passages 100, 102 and 104 flows into the longitudinally extending passages 66 and 76 respectively in the aerofoil 44. The cooling air in passage 66 at the leading edge 46 of the aerofoil 44 flows longitudinally of the aerofoil 44 to the tip where the cooling air flows through the aperture 86.

The cooling air in passage 76 flows longitudinally along the aerofoil 44 to the tip where the cooling air flows into the turning passage 78 and is turned through 180° to flow into passage 74. The cooling air then flows along passage 74 and is again turned through 180° in turning passage 80 into passage 72, likewise the cooling is turned through 180° in turning passages 82 and 84 into passages 70 and 68 respectively. Some of the cooling air in turning passage 82 flows through aperture 90, and cooling air flowing through passage 68 flows through aperture 88 to cool the tip wall 54 of the aerofoil 44.

As discussed previously, the cooling air flowing through the turning passages becomes detached from the end portion of the longitudinally extending walls as it turns around the end portion of the walls, this gives rise to turbulence which leads to pressure losses in the passages. The use of prior art turning vanes in the turning passages of turbine blades has not been of significant benefit.

The invention reduces the pressure losses in the turning passage 78 by providing the longitudinally extending wall 64 with an aerodynamically shaped end portion 92 which is angled with respect to the remainder of the wall 64, this increases the turning radius for the flow of cooling air around the end portion 92 of the wall 64, and provides a smooth curving surface for the flow of the cooling air which aids in reducing separation of the boundary layer. A turning vane 94 extends around the aerodynamically shaped end portion 92 of the wall 64, and the turning vane 94 has a relatively large turning radius and a relatively large surface area in relation to the longitudinal width of passage 96 which assists in the retention of a boundary layer of cooling air on the turning vane 94. The cooling air flowing around the turning vane 94 is directed by the turning vane 94 to flow substantially parallel to the wall 64 as it enters passage 74.

The cooling air flowing through the convergent passage 96 between the aerodynamically shaped end portion 92 of the wall 64 and the turning vane 94 is also directed by the turning vane 94 to flow substantially parallel to the wall 64 as it enters passage 74. The use of a convergent passage 96 reduces the separation of the boundary layer of cooling air from the aerodynamically shaped end portion 92 of the wall 64.

It can be seen that by directing the cooling air leaving the convergent passage 96 and the cooling air flowing around the turning vane 94 substantially parallel to the wall 64, and to each other, into the passage 74 that turbulence and separation of the cooling air from the wall 64 is reduced because these two cooling air flows do not impinge upon and interfere with each other to direct the cooling air away form the wall 64.

The turning passage 78 also converges in the direction of flow of the cooling air from passage 76 to passage 74 and this also helps to prevent or limit separation.

FIG. 4. shows an alternative embodiment of the turning passage 78 shown in FIG. 3. The turning vane 94 is provided with a tail 106 which extends from the turning vane 94 parallel to the wall 64 in passage 74 to ensure that the cooling air flowing in the convergent passage 96 is directed along passage 74 parallel to wall 64.

FIG. 5. shows a further embodiment of the turning passage 78 shown in FIG. 3. The turning passage 78 is provided with bleed holes 108 and 110 positioned in the suction sidewall 50 of the aerofoil 44. Bleed hole 108 is positioned in the convergent passage 96 between the turning vane 94 and the aerodynamically shaped end portion 92, close to the leading edge of the end portion 92, and bleed hole 110 is positioned above the turning vane 94 close to its leading edge. The bleed holes 108 and 110 reduce the separation of the cooling air from the aerodynamically shaped end portion 92 and the turning vane 94 at their leading edges where separation commences to give a smoother flow.

FIG. 6. shows the longitudinally extending passages 66, 68, 70, 72, 74 and 76, and walls 56, 58, 60, 62, and 64 in cross-section. The walls 56, 58, 60, 62 and 64 are substantially perpendicular to the suction and pressure walls 50 and 52 respectively. The walls are arranged preferably at this angle because if the walls 56, 58, 60, 62 and 64 are angled with respect to the perpendicular to the sidewalls at angles substantially different separation of the cooling air occurs. If the walls 56, 58, 60, 62 and 64 are angled in the region of 27° to 30° with respect to the sidewalls the cooling air flowing over the turning vane 94 and the end portion 92 and other walls 56, 58, 60 and 62 flows into the pressure sidewall 52 at the pressure side, and away form the suction sidewall 50 at the suction side. This can be considered as a converging flow on the pressure sidewall and a diverging flow on the suction sidewall, hence separation of the cooling air flow from the suction sidewall 50 over the vane 94 and the aerodynamically shaped end portion 92 of wall 64 in passage 102.

The use of a turning vane and aerodynamically shaped end portion angled with respect to the remainder of an internal wall to produce a convergent passage may be applied to other internal walls of the aerofoil and not just the internal wall adjacent the trailing edge as shown in the example.

The turning vane and aerodynamically shaped end portion angled with respect to the remainder of an internal wall may be applied to the aerofoils of any hollow turbine blade having at least two longitudinally extending passages separated by a wall.

We claim:

1. A hollow fluid cooled turbine blade comprising a root, a platform and an aerofoil, the aerofoil having at least two longitudinally extending passages for the flow of cooling fluid, at least one turning passage where the cooling fluid is turned from the first longitudinally extending passage into the second longitudinally extending passage, a wall being positioned between and separating the longitudinally extending passages, said wall having an aerodynamically shaped end portion adjacent said turning passage, said aerodynamically shaped end portion of said wall being arranged at an angle with respect to the remainder of said wall to increase the turning radius and said aerodynamically shaped end portion of said wall extending towards a second wall defining an opposing boundary of said first passage, a turning vane having a relatively large turning radius being spaced from said aerodynamically shaped end portion of said wall to define a passage therebetween, said passage between said aerodynamically shaped end portion of said wall and said turning vane converging in the direction of flow from said first longitudinally extending passage to said second longitudinally extending passage, said turning vane extending around said aerodynamically shaped portion of said wall towards said second longitudinally extending passage so as to direct cooling fluid flowing from said first passage into said second passage through said converging passage formed between said aerodynamically shaped end portion of said wall and said turning vane substantially parallel to said wall, said turning vane directing the cooling fluid flowing around said turbine vane substantially parallel to the cooling fluid leaving said converging passage so as to reduce separation of the boundary layer of the cooling fluid from said wall in order to reduce pressure losses in said turning passage.

2. A hollow fluid cooled turbine blade as claimed in claim 1 in which the turning vane has a tail extending longitudinally of the blade parallel to said wall in said second passage to direct cooling fluid leaving said passage formed between said aerodynamically shaped end portion of said wall and said turning vane substantially parallel to said wall.

3. A hollow fluid cooled turbine blade as claimed in any of claims 1 to 2 in which the aerofoil is defined by a pressure and a suction sidewall, the suction sidewall being provided with bleed holes, one bleed hole being provided in the converging passage adjacent the leading edge of the aerodynamically shaped end portion of the wall, one bleed hole being provided in the turning passage adjacent the leading edge of the turning vane.

4. A hollow fluid cooled turbine blade as claimed in any of claims 1 to 3 in which said wall and said turning vane form an angle of substantially 90° with a pressure and a suction wall of said aerofoil to reduce separation of the cooling fluid from said wall and turning vane at said suction wall.

5. A gas turbine engine comprising at least one hollow fluid cooled turbine blade as claimed in any of claims 1 to 4.

* * * * *